Aug. 6, 1957 E. B. GIENGER, JR., ET AL 2,801,445
MANUFACTURE OF RUBBER LATEX ARTICLES
Filed April 22, 1953

INVENTOR
Edwin B. Gienger, Jr.
Wilbur A. Miller.

BY

ATTORNEY

United States Patent Office 2,801,445
Patented Aug. 6, 1957

2,801,445

MANUFACTURE OF RUBBER LATEX ARTICLES

Edwin B. Gienger, Jr., and Wilbur A. Miller, Dover, Del., assignors to International Latex Corporation, Dover, Del., a corporation of Delaware Application April 22, 1953, Serial No. 350,341

23 Claims. (Cl. 18—41)

This invention relates to a method and apparatus for making seamless rubber articles, such articles being typically adapted for use as sheaths or envelopes for restraining, protecting or shaping a portion of the human body. A major use of such sheaths has been as rubber girdles, panties and similar undergarments which are economically made from aqueous dispersions of natural rubber or other elastomers, such dispersions being commonly referred to as rubber latex. Because of the public's familiarity with rubber latex girdles, the present invention will be described as applied thereto. However, those skilled in the art will understand how the invention can be employed in the manufacture of other rubber articles.

Rubber latex girdles, as originally disclosed in U. S. Patent 2,360,736, issued October 17, 1944, to A. N. Spanel, have been satisfactory products, as proven by customer acceptance, and have been made additionally attractive to the consuming public by many worthwhile improvements. However, such girdles, because of the relatively impermeable nature of the deposited latex film, could become somewhat uncomfortable when worn by a person who perspires heavily or when worn in a hot or humid atmosphere such as is encountered in many portions of this country during the summer months, unless proper steps are taken to meet the problem. Attempts to provide ventilation of the body by punched perforations or lining the interior of the girdle with fiber have not entirely solved the problem. Indeed, the problem of adequate provision for the escape of moisture from the skin of a wearer of a comfortable enveloping article of rubber is almost as old as the art of making the article itself. This problem has not been entirely solved even though those skilled in the art have known how to prepare perforate rubber sheeting of various types; apparently no feasible method has been found to incorporate such sheeting in an enveloping sheath without producing either a weak article or one which has seams that are uncomfortable. The measure of the success in solving this problem can be judged by the fact that no dipped latex girdles which have completely solved the above problem of ventilation in hot weather have ever been marketed, in spite of the very obvious sales appeal of such an article.

By means of the present invention, the obstacles apparently found insurmountable by previous workers in the field have been overcome and seamless rubber latex articles, typically sheaths or girdles or similar undergarments which are worn in a stretched condition, have been made which are sufficiently pervious or porous as to provide for adequate escape of perspiration, even in hot weather. Such porosity is effected by the generation of a multitude of closely spaced, straight pores communicating with both surfaces of the rubber latex film and formed during the manufacture of the article, as described more fully hereinafter. Such pores advantageously have sides and shoulders shaped by the surface tension exerted on small openings made in a continuous appropriately contoured film of latex while in a plastic, flowable, or moldable condition, and consequently have more resistance to tear than punched or sheared perforations.

Such sheaths can advantageously be generated by dipping in a bath of rubber latex a form having an article generating surface in which there are cavities; removing the dipping form from said bath under conditions, including rate of removal, such that the form is covered by a continuous film of liquid latex (i. e., with substantially all of said pores bridged by films of latex); and creating a multitude of pores in the film of latex by forcing gas out of substantially all of the cavities of the dipping form and thereby breaking or bursting the minute portions of the latex film bridged over each cavity of the dipping form. The deposited latex film, which now contains a multitude of channels or pores communicating with both surfaces of the film, is thereafter processed, as by a procedure which includes repeating the above operation for building up film thickness, stripping the film from the dipping form and trimming, so that the finished product is a marketable article, all as described more specifically hereinafter.

The process described above can be carried out with particular efficiency and effectiveness by employing, generally in accordance with the present invention, a dipping form in which a metallic member, such as an iron core, is in intimate and uniform contact or heat transfer relationship with the cavity-containing portion of the article generating surface of the form. The metallic member of such a dipping form, after the generation of the continuous film of liquid latex (i. e., after removal from the dipping bath) is heated electromagnetically and, in turn, heats the gas trapped in the cavities in the surface of the form so that the gas expands and ruptures the bridging films, thus creating the desired multitude of pores in the film of latex on the dipping form.

In order that the invention may be more clearly understood, reference is now made to the accompanying drawings in which several embodiments of the invention are illustrated, it being understood that these embodiments are shown by way of illustration to indicate that the invention may be embodied in many different forms.

Figure 1:
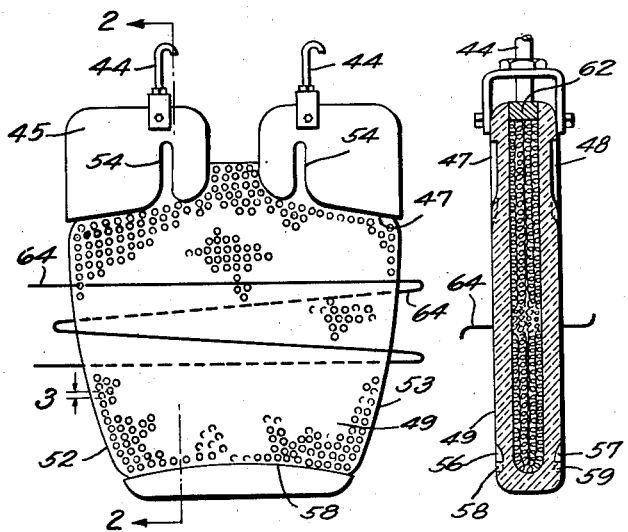
Figure 1 is a front view of a preferred embodiment of a dipping form embodying the present invention.
Figures 2, 2A:
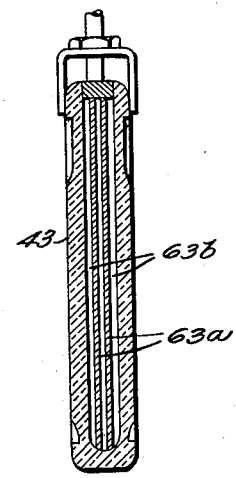
Figure 2 is a cross sectional view of the form of Fig. 1 taken along the line 2—2 of Fig. 1.
Fig. 2A is a cross sectional view similar to Fig. 2 but showing a modified internal construction.

An embodiment of a dipping form for preparing a girdle, in accordance with the invention, is indicated generally at 43 in Figs. 1 and 2. Form 43 is provided with hook-like supporting members 44 which project from the top of the form and are used to support the form during the dipping process hereinafter described and to hold the form when the girdle is stripped off the form at the conclusion of the dipping process. The form has surfaces 45, which project upwardly from depressed portions 47 of main article generating surface 49 as shown in Fig. 2. Main article generating surface 49 functions to generate the front area of the girdle and subsidiary side generating surfaces 52 and 53, function to generate side areas of the girdle. Surface 45, which generates a reinforced edge at the lower margin of the front of the girdle is provided with a substantially perpendicular wall joining it with surfaces 47, the function and the action of which, in generating a marginal reinforcement during dipping, is clearly set forth in U. S. Patents 2,015,632 and 2,086,481, issued September 24, 1935, and July 6, 1937, respectively, to A. N. Spanel. Surfaces 45 have elongated ribbon-like channels 54 which constitute integral continuations of the main girdle generating surfaces 49 and which serve to form garter tabs of the girdle, as described more fully in U. S. Patent 2,360,736. The lowermost portions of main generating surface 49 terminates in a depressed area 56 which is bounded by latitudinally arcuate edge 58 which defines the top of the front of the finished girdle and which cooperates with perpendicular inwardly extending wall joining this edge with the bottom of the form so as to form an edge for trimming as described in the above patents. The reverse side of form 43 is similarly contoured to form with the front side a peripherally complete surface for generating a continuous seamless film.

Figures 3, 4, 5:
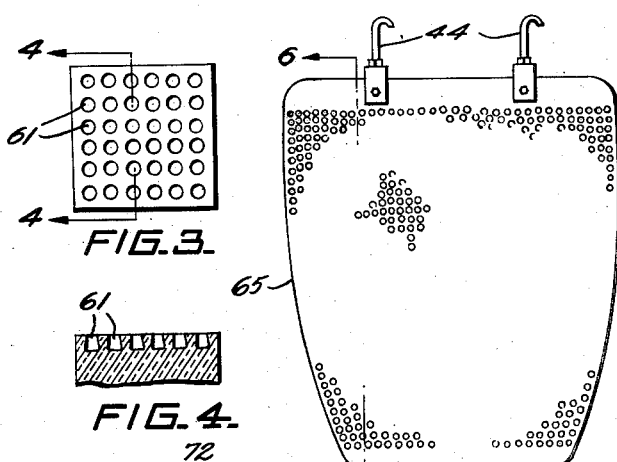
Figure 3 is a greatly enlarged view of a small portion of the surface of the form shown in Fig. 1, as indicated by the area 3 thereof.
Figure 4 is a cross sectional view of the enlarged portion of the form shown in Fig. 3 taken along the line 4—4.
Figure 5 is the front elevation of another dipping form embodying the present invention, which dipping form can be used for producing a modified type of porous girdle.

A multitude of blind pores, cavities, holes or follicles, 61, which are shown more clearly in Figs. 3 and 4, are positioned uniformly over most of the plane surface 49 and over a similar surface on the reverse side of form 43. These cavities 61 may be round as shown in Fig. 3 or of some other shape, e. g., square. These cavities effect an essential step in the formation of the girdle by trapping air during the dipping process, which air thereafter is expanded by heating, with the result that the gas breaks, bursts, ruptures or presses open the wet film of rubber latex which has bridged across the mouth of the cavity during the dipping process, thus forming a pore, hole, orifice or opening in the film of latex deposited on the form. Because of the critical function of these cavities, their dimensions are carefully selected and correlated with the dipping conditions, including the rate or speed at which the dipping form is removed from the bath, the concentration of solids in the rubber latex, the viscosity and particularly the surface tension of the latex employed, so that a film of latex bridges over each cavity. The cavities should not be so wide that a substantial amount of latex runs into and fills up the holes. On the other hand, if the cavities are too small or shallow, the volume of air trapped is insufficient to exert enough pressure to break the bridging film during the subsequent expansion of the gas in the cavity by internal heating of the form. Diameters (or widths where square holes are formed) that are effective are in the range of about 10 to 100 thousandths of an inch, about 15 to 40 thousandths being particularly effective; an effective depth for the smaller cavities is of the order of 20 thousandths of an inch and depends upon the viscosity of the latex while generally the larger holes can be about as deep as they are wide.

In accordance with an aspect of the invention, form 43 is a hollow casing of glass with an opening at the top which, as shown in Fig. 2, can be closed or sealed with a strip or plug 62 of non-metallic material such as synthetic resin, wood or the like. Form 43 is longitudinally contoured, latitudinally flattened and peripherally complete. Form 43, which can be molded or cast in one or more sections, is made of the actinic sensitive type of glass in which the desired cavities can be "chemically machined." The particular photosensitive glass employed is a special composition of silicate glass made photosensitive by the presence of a silver compound and a sensitizer, which is obtainable commercially from the Corning Glass Works at Corning, New York. When such glass is exposed to ultraviolet light and heat treated, it opacifies and becomes very susceptible to attack in the opacified portions by hydrofluoric acid, which preferentially eats or etches these portions. By masking the hollow casing of form 43 with a perforated mask or screen having apertures of the dimension and cross section of the desired cavities, subjecting the masked glass to ultraviolet light for a time correlated with the desired depth of the cavities, developing small opacified portions in the glass by heating it at approximately 1200° F. for about an hour and immersing the cooled, heat treated glass in dilute hydrofluoric acid until the opacified areas are preferentially eaten away, a casing of slightly less than the original thickness and having cavities of the desired dimensions is produced. The cavities are formed in the glass with great precision both as to width and depth and desirably are slightly bottle-necked (with a taper of about 1 and 12) with sharp shoulders.

By this method the depressed areas 47 and 56 can conveniently be formed simultaneously with any desired pattern or cross sectional shape of cavities (where the cross section is perpendicular to the axis of the cavity) by preparing a photographic negative of the proper size from an enlarged representation of the desired surface of form 43 and thereafter using such negative as a mask when the form is exposed to ultraviolet light. The depressed areas in the form are given a continuously downward slope by varying the transmittancy of the negative to ultraviolet light in the areas where such slope is desired. By making the portions of the negative corresponding to areas 45 of the form very dense with sharp boundries, a sharp shoulder at the termination of depressed areas 47 and 56 is advantageously generated.

After cavities 61 and depressed areas 47 and 56 and similar areas on the reverse side of the form have developed, the form is equipped, in accordance with the invention, with a ferromagnetic core. This can advantageously be done by packing magnetic steel wool 63 in the form so that it uniformly and intimately contacts the interior surfaces of the hollow casing of glass corresponding to the cavity-containing portions of the outside surface. Alternatively one or more magnetic steel or iron plates or sheets 63a, as shown in Fig. 2A, can be placed in the interior of the casing in place of the steel wool 63, care being taken that such plate or plates are dimensioned and arranged so that they are substantially coextensive with the cavity-containing portions of the surface. In order to insure that the plate or plates are in uniform and effective heat transfer relationship with the interior surfaces of the casing instead of being separated therefrom by a less effective and possibly irregular air gap, the interior of the case is filled with a liquid heat transfer medium 63b. Such a liquid is advantageously relatively non-volatile, with a boiling point preferably in excess of about 300° F., and relatively inert under the conditions of use so that it does not form gum or decompose thermally. Appropriate organic liquids are chlorinated or fluorinated hydrocarbons, silicones, high boiling ethers and the like. Such liquid heat transfer media can be employed to further increase the thermal efficiency of steel wool packing 63. The form is then plugged or sealed with plug 62 and hook-like members 44 attached to the form, using holes drilled through the form for this purpose.

In order to generate a film on the surface of form 43, it is immersed in a bath of rubber latex, typically a natural latex compounded with vulcanizing agents, with the planes of generating surfaces 49 and 51 perpendicular to the surface of the bath, and then slowly removed from the bath, as one example, at a constant speed in the range of about 0.1 to 0.5 foot per minute. This operation forms a thin continuous film over the entire surface of the form, which is preferably immersed in the bath until the lowermost portions of hook-like members 44 are beneath the surface of the bath. Essentially all the cavities 61 on the surface of the form contain pockets of entrapped air covered by bridging films which are integral portions of the continuous film covering the dipping form. For this operation, rubber latices containing from about 55 to 65 percent solids are satisfactory.

In accordance with a method aspect of the present invention, form 43, as it emerges from the dipping bath, is subjected to the action of an electromagnetic field generated by an induction heating coil 64, which advantageously is a coil of water cooled copper tubing connected to a source of alternating current of appropriate high frequency. (The details of frequency, power requirements, strength of magnetic field, etc., to achieve satisfactory induction heating are well known. See, for example, "Industrial Electronics Reference Book" by Electronics Engineers of the Westinghouse Electric Corp., John Wiley and Sons, Inc., New York 1948, page 375 et seq.). Such a magnetic field heats steel wool 63 which transfers such heat to the interior wall of the hollow glass casing and uniformly heats the walls of cavities 61, which walls in turn heat the gas entrapped in the cavities so that the gas expands and breaks, ruptures, or blows open the still plastic, flowable, or moldable bridging films over the cavities, thus forming the desired pores in the film of latex on the dipping form. The material in the broken films thereafter adjusts itself according to the forces of surface tension both around the hole or pore so formed and in the area surrounding the port, thereby building up the web-like ribs between the pores at a faster rate than by the normal dipping process.

It has been found that the force of surface tension so controls and molds the shape of the opening in the film of latex that a round hole is often formed even when square mouthed cavities are used, particularly if the film is built up to a thickness of 25 thousandths of an inch or more. Because the periphery of the pore formed by the above process is smooth and continuous, it resists tearing to a much greater extent than does a cut or perforated hole whose periphery necessarily contains minute nicks or cuts in arising from the inevitable irregularity of any perforating device.

It will be noted that the above described method quickly, uniformly and progressively heats the form as it progressively emerges from the bath of latex, thus achieving continuous process control over the operation of blowing the bridging films over the cavities. The walls of all of the cavities in the film are subjected to uniform heating at substantially identical times with relation to their emergence from the bath of latex, thus achieving very exact control over the blowing operation which results in an extremely uniform product. Additionally the amount of heat generated in the steel wool can be adjusted by varying the electromagnetic field so that the film of latex partially or completely dries. Additional drying or partial or complete curing of the finished latex film can be effected by additional induction heating, using a second coil which desirably can encompass the whole form.

After the deposited latex film has been dried or solidified to a point where subsequent dipping will not disturb the film, such as by induction heating as described above or by known methods including drying in an oven, the form is cooled, as in a water bath or in the atmosphere, and is subsequently dipped and blown alternately until the desired film thickness, such as a film thickness in the porous area of about 15 to 80 thousandths, and preferably about 25 to 50 thousandths of an inch, is built up on the form. The deposited latex film can then be removed from the form, cured and trimmed to yield a girdle or can be processed by any method for producing marketable dipped latex articles. In any event, the film should be treated while still on the form, as by drying and/or partial or complete curing, so that the film can be removed from the form in an unruptured condition. It will be noted that, because of its method of formation, the pores or holes in the finished girdle are much more tear-resistant than if such holes were formed by perforating or punching a cured continuous film or sheet of rubber, for the reasons noted above. Additionally it has been observed that a porous film formed by the process of the present invention resists further tearing even after the web between the holes is torn, a characteristic which is in sharp contrast to an ordinary film of latex which tends to tear or rip without restraint once a tear is started.

Figure 6:
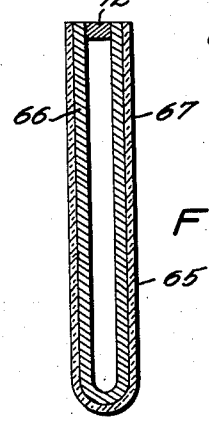
Figure 6 is a cross sectional view of the form of Fig. 5 taken along the line 6—6.

Figures 5 and 6 illustrate an embodiment of a dipping form, indicated generally at 65, which is adapted to generate a deposited latex article and which comprises a hollow, shaped or contoured metallic casing 66 covered by a vitreous coating 67 and hook-like members 44. Form 65, as shown in Fig. 5, will generate a girdle without a crotch portion, but it is to be understood that the form may be modified to provide a crotch generating section, and/or garter tab generating surfaces similar to those described in connection with Figs. 1 and 2. The vitreous coating is advantageously a porcelain coating having a thickness of between about 30 and 50 thousandths of an inch, which has been fired, by known methods, on the surface of a magnetic steel or iron sheet-like hollow casing 66 so as to give an adherent coating integrally bonded to the underlying metal.

Blind holes or cavities, similarly dimensioned to cavities 61 described above, can be created by a cavitation method in the surface of form 65 which is desirably formed and subsequently ground so as to have a surface flat within about a few thousandths of an inch, using a tool which can be made of carbon steel, brass or the like metal and which has square or rectangular nubs projecting from the face thereof. The tool is placed in a machine which oscillates at a very high frequency, such as the machine described in U. S. Patent 2,580,716, issued January 1, 1952, to Lewis Balamuth, and lightly pressed against the surface of form 65 while the surface is bathed in a liquid vehicle containing a fine abrasive. In a manner described fully in the patent, the tool cavitates the liquid and causes the abrasive to cut a negative or reverse replica of the tool face in the surface of the brittle porcelain coating with great precision and desirably forms extremely sharp shoulders on the cavities generated therein. By carefully shifting the cutting position of the tool over the surface of the form, any desired composite pattern based on the unit pattern of the tool can be created. This method of generating cavities by cavitation can also be employed to create cavities in the surface of a glass form such as that described above in connection with Figs. 1 and 2.

Dipping form 65, after completion of the cavities in the surfaces thereof, is blocked or sealed at the top with a block 72 similar to block 62 in Fig. 2, after the form has been appropriately weighted so that it is not buoyant in the bath of latex. Dipping form 65 is thereafter employed in the manner described in connection with the form shown in Figs. 1 and 2, the hollow metal casing 66 acting as the metallic member which is inductively heated and which in turn heats the walls of the cavities in the porcelain coating. It has been found that superior results are obtained when the porcelain coating is thick enough so that the bottoms of the cavities are separated from the metal casing by a thin layer of porcelain (i. e., the cavities do not extend through the porcelain).

It is to be noted that a dipping form comprising a vitreous coating and a sheet-like magnetic metallic member can take other forms than that illustrated in Fig. 5. For example the form may comprise curved tubes which are bent in the shape of sides 73 and 74 of the form shown in Fig. 5, these tubes being permanently joined, as by welding or by slotting, to a flat sheet of magnetic metal which serves both as a heating member and as a rigid backing for the main girdle generating surface. A metal form so fashioned is thereafter covered on both sides of the flat sheet with a porcelain coating in which cavities are generated as described above. Other equivalent forms will occur to those skilled in the art after reading this specification.

Alternatively, the cavity containing surface can be a sleeve or casing of non-magnetic material, which sleeve has an outer surface containing cavities as described herein. The sleeve can be made of an elastic material, typically soft vulcanized rubber, which is stretched over a shaped metallic form such as metal casing 66, or it can be made of an inelastic material, such as nylon, polystyrene or the like, and fitted on a shaped metallic form in one or more pieces. Such sleeves may have either cavities or pores open at both ends therein. Provision should be made, in the even that the sleeve has pores rather than cavities, to prevent gaseous communication between the pores since malfunctioning of the blowing operation can occur when this condition exists. Such provision can effectively be made by cementing or bonding the sleeve to the casing or preferably to a backing, which can, in turn, be cemented or bonded to the casing.

Such sleeves can be made from plastic materials on a master form similar to the dipping forms described herein by similar methods. In the event that the sleeve is formed in such a manner and the cavities can be closed on one side by omitting the blowing step in the last few dips. Advantageously, such a sleeve can be made of an elastic, subsequently hardenable material, for example, unvulcanized hard rubber, which is placed on the metal casing in a reversed position (i. e., with the imperforate backing inward) and cured or vulcanized on the form to yield a hard, inelastic surface. Sharp shoulders can thereafter be generated on the cavities by grinding. Instead of a sleeve, the cavity-containing surface can be a flat or curved sheet, such as a sheet of injection molded plastic, which is cemented or bonded to those flat or curved surfaces of a metal dipping form in which cavities are desired.

Figure 7:
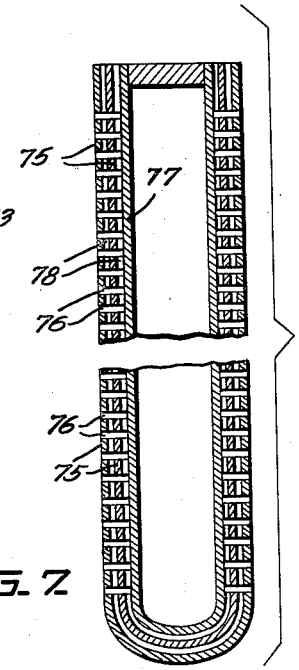
Figure 7 is an enlarged sectional view of another dipping form embodying the present invention.

Additionally, dipping forms can be employed in which the surface of the metallic member that is inductively heated constitutes the cavity-containing surface. Such forms can be fabricated by assembling a plurality of thin perforate metallic sheets 75 having an identical pattern of holes on the form with the holes 76 of the sheets in registry with each other as shown in Fig. 7. These sheets are bonded to themselves and to the form 77 with a non-metallic adhesive 78. The adhesive, typically a thermosetting or thermoplastic resin, prevents gaseous communication between the cavities so created. Such a form can also be made by spraying metal on a reverse replica of the cavity containing surface and thereafter placing a sheet of the sprayed metal on a rigid backing, which provides support for the sprayed metal.

Although the present invention has been described with particularity with reference to preferred embodiments and various modifications thereof, it will be obvious to those skilled in the art, after understanding the invention, that various changes and other modifications may be made therein without departing from the spirit and scope of the invention and the appended claims should therefore be interpreted to cover such changes and modifications.

We claim as our invention:

1. A form for making porous, seamless deposited latex articles which comprises a vitreous article generating surface, a portion of said surface comprising a multitude of small cavities bridgeable by liquid rubber latex, and a ferro-magnetic core in uniform heat transfer relationship with the cavity-containing portion of said surface and coextensive therewith.

2. The form of claim 1 in which the vitreous surface is a porcelain coating fired on the ferromagnetic core.

3. The form of claim 2 in which the cavities have square shoulders cut by cavitation.

4. The form of claim 1 in which the vitreous surface is glass.

5. The form of claim 4 in which the glass is an actinic sensitive glass opacifiable by heat treatment and said cavities are generated by etching opacified small areas of said glass.

6. The form of claim 1 in which a layer of a liquid transfer medium is in contact with the ferromagnetic core and the vitreous surface over the entire cavity-containing portion of the latter.

7. The form of claim 6 in which the ferromagnetic core is a sheet of iron.

8. The form of claim 6 in which the heat transfer medium is a relatively non-volatile, relatively inert organic liquid.

9. A contoured, rigid dipping form for making porous, seamless deposited latex sheath-like articles which comprises an impermeable article generating surface, a portion of said surface comprising small cavities bridgeable by liquid rubber latex and having side and bottom walls impermeable to the flow of gas trapped therein, and a magnetic member in intimate and uniform contact with the cavity-containing portion of said surface and coextensive therewith.

10. The form of claim 9 in which the width of the cavities is in the range of about 10 to 100 thousandths of an inch.

11. The form of claim 9 in which the surface of said metallic member constitutes said cavity-containing surface.

12. The form of claim 11 in which said metallic member comprises a plurality of metallic sheets having an identical pattern of small holes therein, said sheets being assembled with the holes in registry and bonded with a non-metallic adhesive that prevents gaseous communication between said holes.

13. The form of claim 9 in which said metallic member is ferromagnetic.

14. The form of claim 13 in which the ferromagnetic member is sheet-like steel.

15. A form for making a porous, seamless, deposited latex article which comprises a hollow casing of glass sealed at least at the bottom and sides thereof, a major portion of the surface of said casing comprising a multitude of small cavities bridgeable by liquid rubber latex, and a steel member in intimate and uniform contact with the interior wall of the cavity-containing portion of said casing.

16. A form for making a porous, seamless, deposited latex girdle which comprises a girdle generating surface and a crotch generating surface, substantial portions of both the girdle generating surface and the crotch generating surface comprising a multitude of small cavities bridgeable by liquid rubber latex, and a metallic member in heat transfer relationship with the cavity-containing portions of said surface.

17. In a method of preparing a seamless, porous rubber latex girdle, the steps of dipping in a bath of rubber latex a form having a ferromagnetic member and continuous crotch generating and girdle generating surfaces, the major portions of said surfaces comprising a multitude of small cavities bridgeable by said rubber latex, removing from said bath the form covered by a continuous film of said latex, forcing gas out of substantially all of said cavities by inductively heating said ferromagnetic member and thereby creating a multitude of pores in said film.

18. In a method of preparing a seamless, porous article of rubber, the steps of dipping in a bath of rubber latex a form having a ferromagnetic core and a continuous film generating surface, a portion of said surface comprising a multitude of small cavities bridgeable by said rubber latex, removing said form from said bath covered by a continuous film of said latex, forcing gas out of substantially all of said cavities by inductively heating said ferromagnetic core and thereby creating a multitude of pores in said film.

19. In a method of preparing a seamless, porous, deposited latex article, the steps of dipping into a bath of latex a rigid dipping form having a latitudinally flattened shape and comprising a metallic member and article generating surfaces on both of the flattened sides, said generating surfaces being impermeable to fluids and at least a portion thereof comprising small cavities bridgeable by said latex, removing from said bath the dipping form covered by a continuous film of said latex, forcing gas out of said cavities by inductively heating said metallic member and thereby creating a multitude of pores in said film.

20. The method of claim 19 in which said form is progressively inductively heated as the dipping form progressively emerges from the bath of latex.

21. The method of claim 19 in which the induction heating furnishes sufficient heat to dry the film.

22. The method of claim 21 in which the dipping and induction heating are repeated until the film has a thickness of about 15 to 80 thousandths of an inch.

23. The method of claim 19 in which said film of rubber comprises natural rubber latex and vulcanizing agents and induction heating is employed to at least partially cure the completely deposited latex article on the form.

References Cited in the file of this patent

UNITED STATES PATENTS

| | | |
|---|---|---|
| 1,906,569 | Gibbons | May 2, 1933 |
| 2,015,632 | Spanel | Sept. 24, 1935 |
| 2,032,923 | Eldridge | Mar. 3, 1936 |
| 2,032,942 | Linscott et al. | Mar. 3, 1936 |
| 2,100,576 | Spanel | Nov. 30, 1937 |
| 2,100,578 | Spanel | Nov. 30, 1937 |
| 2,169,475 | Spanel | Aug. 15, 1939 |
| 2,234,842 | Jordan | Mar. 11, 1941 |
| 2,359,948 | Tillotson | Oct. 10, 1944 |